United States Patent
Maienschein et al.

(10) Patent No.: US 8,490,766 B2
(45) Date of Patent: Jul. 23, 2013

(54) HYDRODYNAMIC TORQUE CONVERTER

(75) Inventors: Stephan Maienschein, Baden-Baden (DE); Peter Droll, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/571,491

(22) Filed: Aug. 10, 2012

(65) Prior Publication Data
US 2012/0298461 A1    Nov. 29, 2012

Related U.S. Application Data

(63) Continuation of application No. PCT/DE2011/000103, filed on Feb. 4, 2011.

(30) Foreign Application Priority Data

Feb. 16, 2010 (DE) .......... 10 2010 008 178
Mar. 11, 2010 (DE) .......... 10 2010 011 143

(51) Int. Cl.
*F16H 45/02* (2006.01)
*F16F 15/131* (2006.01)

(52) U.S. Cl.
USPC .............. 192/3.29; 74/574.2; 192/55.61

(58) Field of Classification Search
USPC ............ 192/213.2; 74/574.2; 464/68.8
See application file for complete search history.

(56) References Cited

U.S. PATENT DOCUMENTS

| 6,026,940 | A | * | 2/2000 | Sudau | 192/3.28 |
| 6,050,376 | A | * | 4/2000 | Yabe | 192/3.29 |
| 8,161,740 | B2 | | 4/2012 | Krause et al. | |

FOREIGN PATENT DOCUMENTS

| DE | 19804227 | 8/1999 |
| DE | 102006028556 | 1/2007 |
| DE | 102008057647 | 6/2009 |

* cited by examiner

*Primary Examiner* — Rodney Bonck
(74) *Attorney, Agent, or Firm* — Simpson & Simpson, PLLC

(57) ABSTRACT

The hydrodynamic torque converter having a torque converter lockup clutch and a converter housing connected at the drive side, and a pump wheel non-rotatably connected thereto, as well as a turbine wheel non-rotatably connected at the output side to an output hub, and a torsional vibration damper actively arranged between the clutch output of the torque converter lockup clutch and the output hub, and including a centrifugal pendulum device arranged within the converter housing and having a pendulum flange with slightly swiveling pendulum masses thereupon, where the pendulum flange is arranged axially between the torsional vibration damper and the turbine wheel and is non-rotatably connected to a damper output part of the torsional vibration damper, and the damper output part and/or the pendulum flange are directly connectable via an interlocking connection to the drive hub.

7 Claims, 4 Drawing Sheets

HYDRODYNAMIC TORQUE CONVERTER

CROSS-REFERENCE TO RELATED APPLICATIONS

This application is filed under 35 U.S.C. §120 and §365(c) as a continuation of International Patent Application No. PCT/DE2011/000103 filed Feb. 4, 2011, which application claims priority from German Patent Application No. 10 2010 008 178.7, filed Feb. 16, 2010, and German Patent Application No. 10 2010 011 143.0, filed Mar. 11, 2010, which applications are incorporated herein by reference in their entireties.

FIELD OF THE INVENTION

The invention relates to a hydrodynamic torque converter.

BACKGROUND OF THE INVENTION

Such hydrodynamic torque converters can, for example, be arranged in a drivetrain of a motor vehicle for transmitting torque between an internal combustion engine and a transmission. Such hydrodynamic torque converters have a pump wheel connected at the drive-side that causes fluid to flow toward a turbine wheel connected to the output side and can drive it therewith. Before the fluid flows from the turbine wheel back into the pump wheel, it passes through a guide wheel and, in certain situations, undergoes a change in the direction of flow which influences the torque transmitted between the pump wheel and turbine wheel.

It is also known to arrange a torque converter lockup clutch in the hydrodynamic torque converter to bypass the hydrodynamic torque transmission caused by the fluid. The lockup clutch optionally connects the drive side, for example, the converter housing non-rotatably connected to the pump wheel, to an output side, for example, in the form of an output hub connectable to a transmission input shaft by means of interlocking. In such situations, fluctuations in torsion caused by an internal combustion engine connected to the converter housing can be transmitted to the output hub, which is why a torsional vibration damper is normally actively arranged in the flow of force between the clutch output of the converter lockup clutch and the output hub to dampen torsional vibrations. Given certain circumstances and requirements on the hydrodynamic torque converter, the damping properties of the torsional vibration damper are insufficient. A centrifugal pendulum device can be arranged within the converter housing to improve the damping properties of the hydrodynamic torque converter.

BRIEF SUMMARY OF THE INVENTION

The object of the invention is to improve the connection of the centrifugal pendulum device and the torsional vibration damper in the torque converter.

Accordingly, a hydrodynamic torque converter is proposed having a torque converter lockup clutch and a converter housing connected at the drive side, and a pump wheel non-rotatably connected thereto, as well as a turbine wheel non-rotatably connected at the output side to an output hub, and a torsional vibration damper actively arranged between the clutch output of the torque converter lockup clutch and the output hub, and including a centrifugal pendulum device arranged within the converter housing and having a pendulum flange with slightly swiveling pendulum masses thereupon, where the pendulum flange is arranged axially between the torsional vibration damper and the turbine wheel and is non-rotatably connected to a damper output part of the torsional vibration damper, and the damper output part and/or the pendulum flange are directly connectable via an interlocking connection to the drive hub. This enables the torsional vibration damper and pendulum flange to be economically, and at the same time stably, attached to the output hub. The torsional vibration damper can be designed as a sequential damper having first and second sequentially effective energy storage elements, where the first energy storage elements are effectively arranged between a damper input part and an intermediate damper part, and the second energy storage elements are effectively arranged between the intermediate damper part and damper output part. It is also conceivable to design the torsional vibration damper as a single damper with a damper output part that can be pivoted slightly in relation to a damper input part under the effect of energy storage elements.

In one embodiment of the invention, the keyed connection is designed as interlocking, or press-fitting, or welding or riveting. Interlocking can enable limited axial shiftability of the non-rotatably connected components. It is preferable to axially secure the two components connected by interlocking, for example, by means of a locking ring.

In another embodiment of the invention, the turbine wheel is connected to the drive hub by means of an additional interlocking connection, especially by means of a rivet element. The turbine wheel can also be press-fit or welded to the drive hub.

In yet another embodiment of the invention, the pendulum flange is riveted to the damper output part, but it can also be welded, screwed, press fit or connected by means of a spacing bolt.

Additional advantages and advantageous embodiments of the invention are found in the description and figures that, for the sake of clarity, are not reproduced true to scale. All of the explained features can be used in the indicated combination as well as other combinations or by themselves without departing from the scope of the invention.

BRIEF DESCRIPTION OF THE SEVERAL VIEW OF THE DRAWING

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
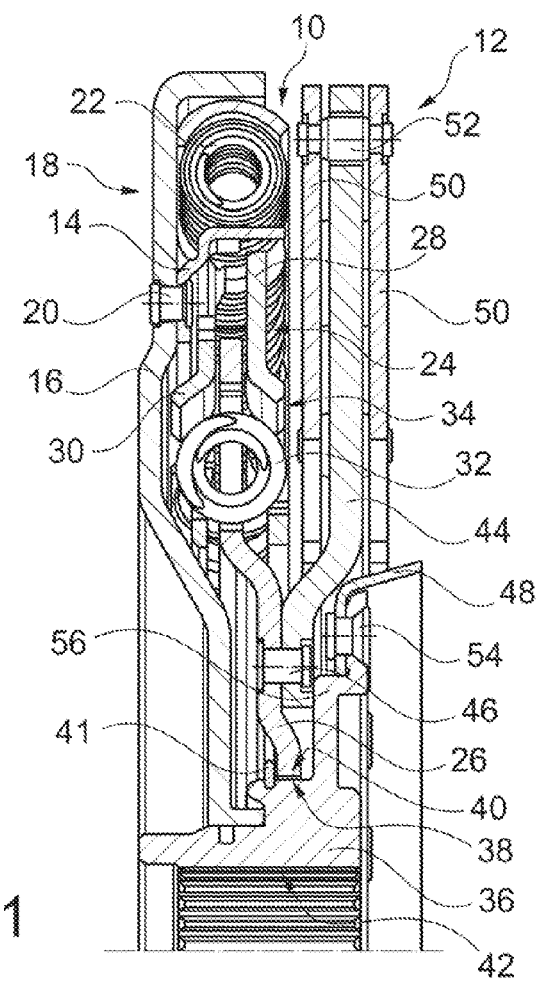
FIG. 1 illustrates a section of a hydrodynamic torque converter in one embodiment of the invention.
Figure 2:
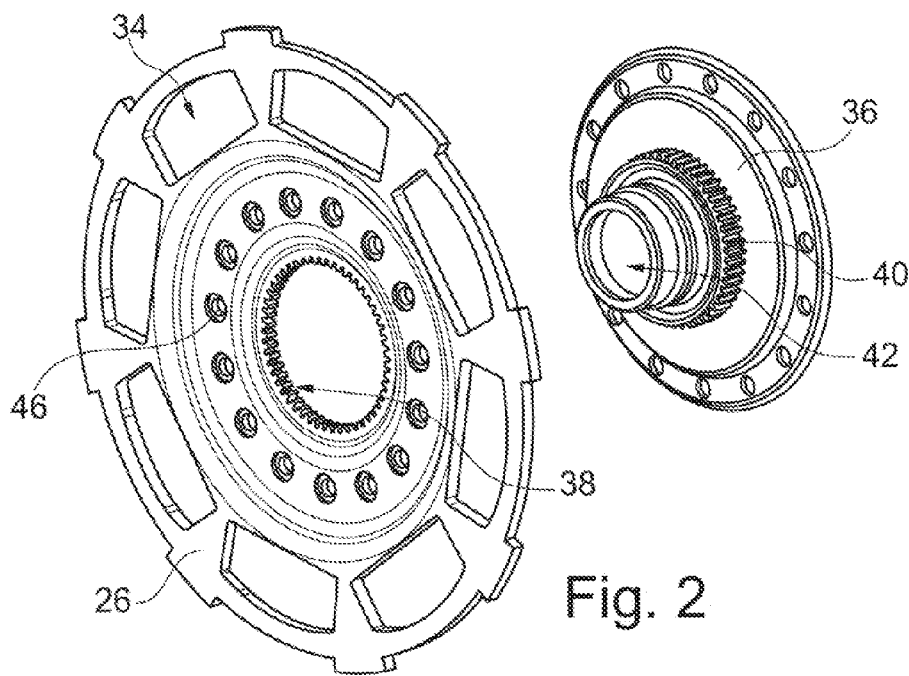
FIG. 2 is a three-dimensional view of the damper output part and drive hub shown in FIG. 1.

FIG. 1 shows a section of a hydrodynamic torque converter in one embodiment of the invention, and FIG. 2 shows a three-dimensional view of the damper output part and the drive hub. The section shows torsional vibration damper 10 and centrifugal pendulum device 12 arranged within a converter housing and designed as a sequential damper. Damper input part 14 of torsional vibration damper 10 is connected to clutch output 16 of torque converter lockup clutch 18 that is non-rotatably connected by means of rivet element 20. Damper input part 14 is connected by means of first energy storage elements 22 lying radially on the outside to damper intermediate part 24 that is slightly pivotable in relation to damper input part 14. Damper input part 14 encloses first energy storage elements 22, such as bow springs, to secure them radially and axially. On a first peripheral side, first energy storage elements 22 are contacted by damper input part 14, and their transference of force to a second peripheral side end of first energy storage elements 22 can be tapped by a contact element affixed to intermediate damper part 24. Intermediate damper part 24 consists of two axially spaced disk parts 28, 30 that axially accommodate damper output part 26 between themselves. Intermediate damper part 24 is effectively connected to damper output part 26 by means of two energy storage elements 32 such as pressure springs accommodated in sections 34 in disk part 28.

Damper output part 26 expands radially inward toward drive hub 36 and is non-rotatably connected thereto by means of a keyed connection such as the interlock shown here, and is axially secured by means of locking ring 41 to the drive hub. Damper output part 26 as well as drive hub 36 has interlock 38, 40 that engages with itself Drive hub 36 is connected at the inside to interlock 42 for connecting to a transmission input shaft of a transmission.

Radially to the outside of the keyed connection between damper output part 26 and drive hub 36, pendulum flange 44 of centrifugal pendulum device 12 has a keyed fit with damper output part by means of rivet element 46. Pendulum flange 44 is basically designed as a disk-shaped part and extends axially neighboring torsional vibration damper 10 and turbine wheel 48, where pendulum flange 44 accommodates pendulum masses 50 arranged on both sides in an area radially to the outside. Pendulum masses 50 are attached to each other by means of spacing bolts 52 and can pivot slightly in relation to pendulum flange 44 along cutouts in pendulum flange 44. Pendulum masses 50 can roll in relation to pendulum flange 44 by means of rolling elements in cutouts of pendulum masses 50 and pendulum flange 44 to generate a pendulum motion.

Output hub 36 is non-rotatably connected to turbine wheel 48 by means of a keyed connection approximately at the radial height of rivet element 46 as shown here by means of rivet element 54. Output hub 36 has flange-like section 56 for accommodating turbine wheel 48.

Figure 3:
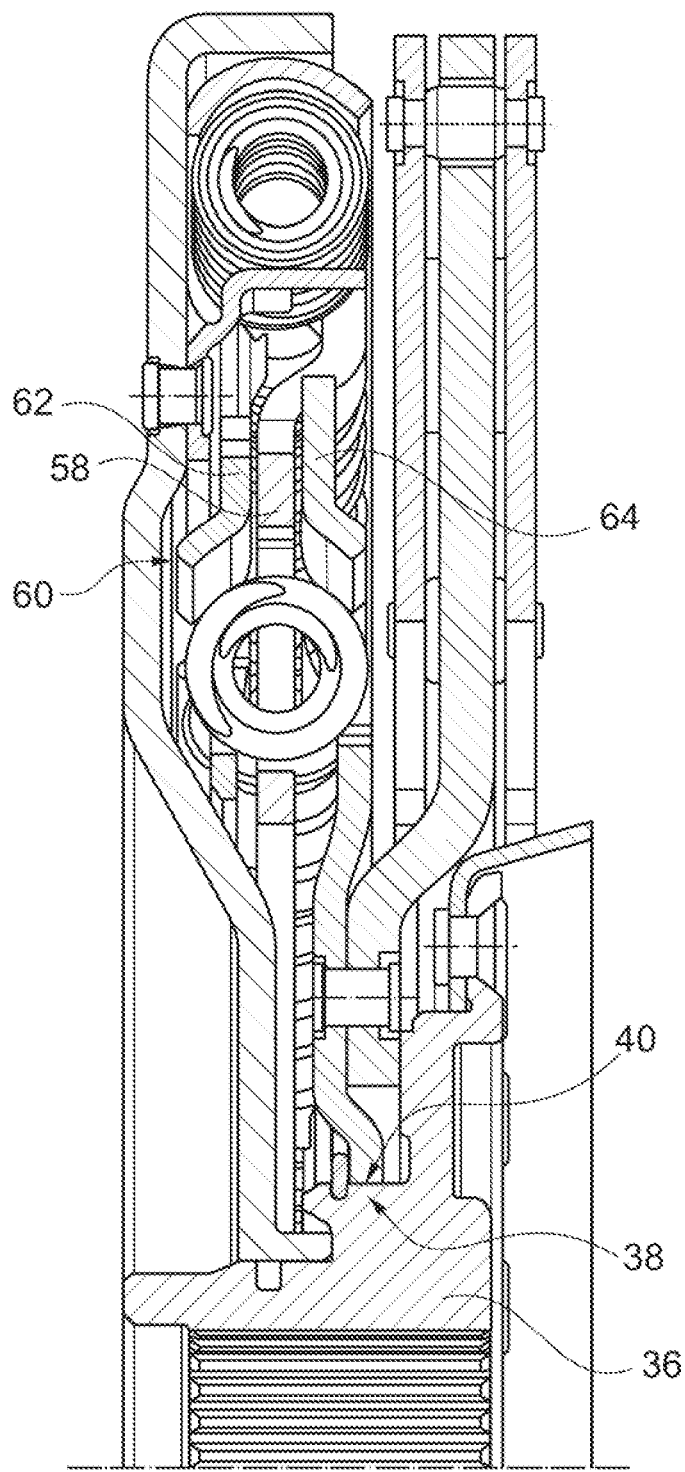
FIG. 3 illustrates a section of a hydrodynamic torque converter in another embodiment of the invention.

FIG. 3 shows a section of a hydrodynamic torque converter in another embodiment of the invention. This embodiment is designed similar to the one in FIG. 1 with the substantial difference that intermediate damper part 58 is designed as a disk-like component and is arranged axially between two disk parts 62, 64 of damper output part 60. Disk part 64 extends radially inward such that it can be non-rotatably connected to interlock 38 of drive hub 36 at its interlock 36 attached to its radial interior.

Figure 4:
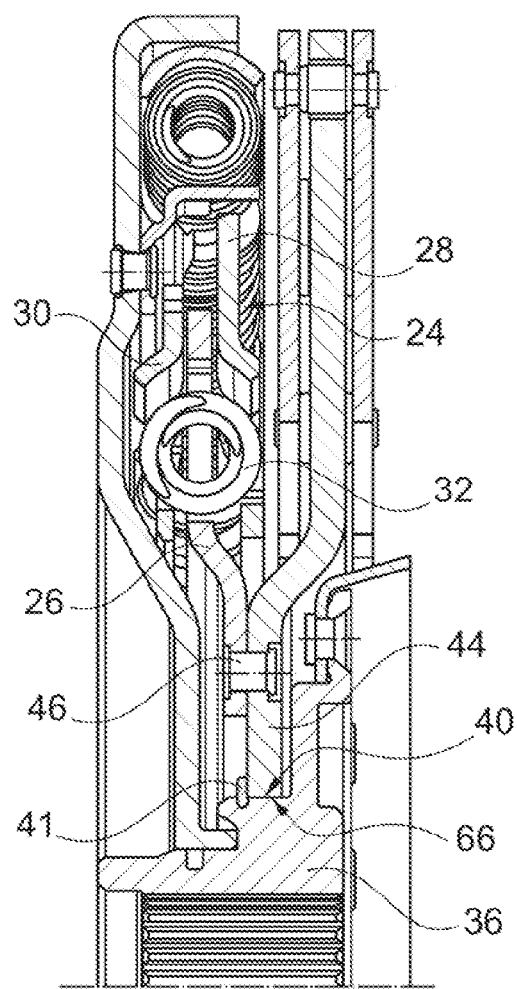
FIG. 4 illustrates a section of a hydrodynamic torque converter in yet another embodiment of the invention.
Figure 5:
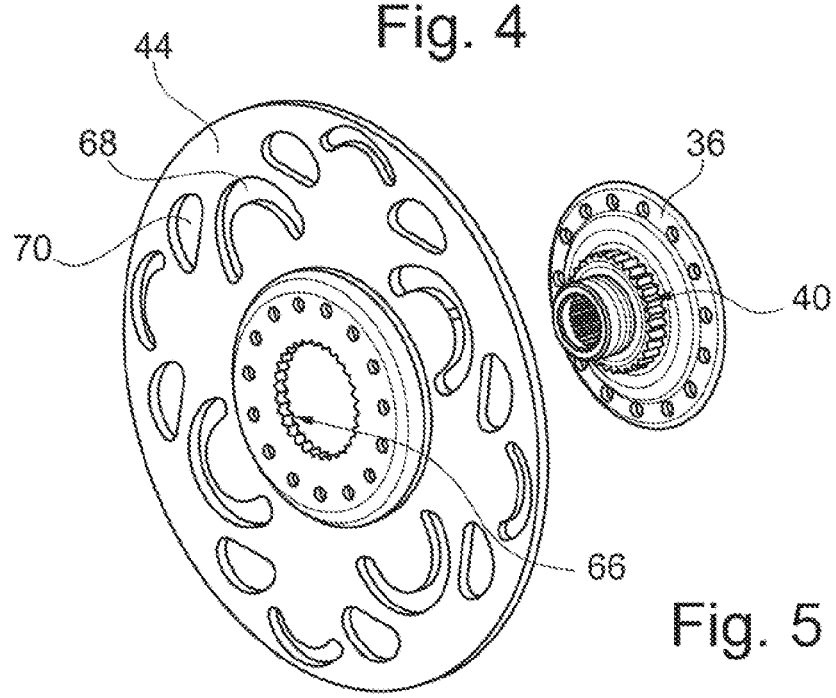
FIG. 5 is a three-dimensional view of the pendulum flange and drive hub shown in FIG. 4; and, FIG. 6 illustrates a section of a hydrodynamic torque converter in another embodiment of the invention.

FIG. 4 shows a section of a hydrodynamic torque converter in yet another embodiment of the invention. Similar to the design in FIG. 1, damper output part 26 is designed as a disk-like component and is axially enclosed by two disk parts 28, 30 of intermediate damper part 24 in the area of second energy storage elements 32. Damper output part 26 is non-rotatably connected by means of rivet element 46 to pendulum flange 44, where pendulum flange 44 is extended radially inward and has interlock 66 on its inside and engages thereby with interlock 40 of output hub 36 and can be non-rotatably connected thereto. Pendulum flange 44 is axially secured to output hub 36 by means of locking ring 41. FIG. 5 illustrates the three-dimensional design of pendulum flange 44 and output hub 36. In a section radially to the outside, pendulum flange 44 has cutouts 68 to accommodate bolts for fastening the pendulum masses that axially oppose each other in pairs, and cutouts 70 to accommodate the rollers for guiding the pendulum masses in relation to pendulum flange 44.

Figure 6:
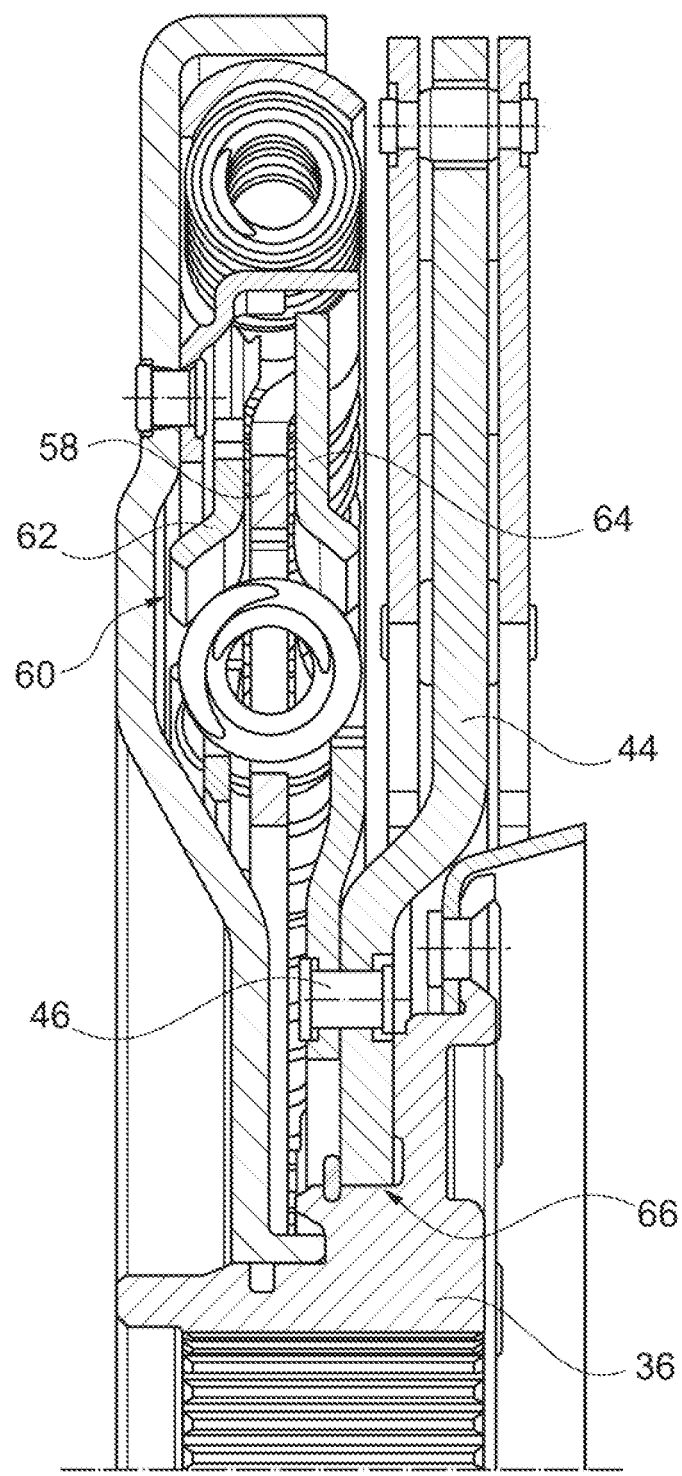

FIG. 6 shows a section of a hydrodynamic torque converter in another embodiment of the invention. This embodiment is similar to the version in FIG. 4 with the substantial difference that intermediate damper part 58 is designed as a disk-like component and is arranged axially between two disk parts 62, 64 of damper output part 60. Disk part 64 is extended radially inward such that it can be non-rotatably connected to the pendulum flange by means of rivet element 46, where pendulum flanged 44 has interlock 66 on its inside to connect to output hub 36.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE CHARACTERS

10 Torsional vibration damper
12 Centrifugal pendulum device
14 Damper input part
16 Clutch output
18 Torque converter lockup clutch
20 Rivet element
22 Energy storage element
24 Intermediate damper part
26 Damper output part
28 Disk part
30 Disk part
32 Energy storage element
34 Cut out
36 Output hub 38 Gearing
40 Gearing
42 Gearing
41 Locking ring
44 Pendulum flange
46 Rivet element
48 Turbine wheel
50 Pendulum masses
52 Spacing bolts
54 Rivet element
56 Flange-like section
58 Intermediate damper part
60 Damper output part
62 Disk part
64 Disk part
66 Gearing
68 Cut out
70 Cut out

What is claimed is:

1. A hydrodynamic torque converter, comprising:
a torque converter lockup clutch including a drive side and a clutch output;
a converter housing connected at the drive side;
a pump wheel non-rotatably connected to the converter housing;
a turbine wheel with an output side; and,
a torsional vibration damper comprising:
a drive hub;
a damper output part; and,
a centrifugal pendulum device arranged within the converter housing and having a pendulum flange with slightly swiveling pendulum masses thereupon, wherein:
the turbine wheel is non-rotatably connected at the output side to the drive hub;
the torsional vibration damper is actively arranged between the clutch output and the drive hub;
the pendulum flange is arranged axially between the torsional vibration damper and the turbine wheel and is directly non-rotatably connected to the damper output part of the torsional vibration damper, and
the damper output part or the pendulum flange is directly non-rotatably connected to the drive hub.

2. The hydrodynamic torque as recited in claim 1, wherein the damper output part is non-rotatably connected to the drive hub by a keyed connection, which is designed as an interlock.

3. The hydrodynamic torque converter as recited in claim 1, wherein the damper output part is non-rotatably connected to the drive hub by a keyed connection, which is designed as a press fit or weld.

4. The hydrodynamic torque converter as recited in claim 1, wherein the turbine wheel is connected to the drive hub by means of a rivet element.

5. The hydrodynamic torque converter as recited in claim 1, wherein the pendulum flange is riveted to the damper output part.

6. A hydrodynamic torque converter, comprising:
a torque converter lockup clutch including a drive side and a clutch output;
a converter housing connected at the drive side;
a pump wheel non-rotatably connected to the converter housing;
a turbine wheel with an output side; and,
a torsional vibration damper comprising:
a drive hub;
at least one energy storage element;
first and second disc parts engaged with the at least one energy storage element;
an intermediate damper part axially located between the first and second disc parts and engaged with the at least one energy storage element;
a damper output part including the second disc part and
a centrifugal pendulum device arranged within the converter housing and having a pendulum flange with slightly swiveling pendulum masses thereupon, wherein:
the turbine wheel is non-rotatably connected at the output side to the drive hub;
the torsional vibration damper is actively arranged between the clutch output and the drive hub;
the pendulum flange is arranged axially between the torsional vibration damper and the turbine wheel and is directly non-rotatably connected to the second disc part, and
the damper output part or the pendulum flange is directly non-rotatably connected to the drive hub.

7. A hydrodynamic torque converter, comprising:
a torque converter lockup clutch including a drive side and a clutch output;
a converter housing connected at the drive side;
a pump wheel non-rotatably connected to the converter housing;
a turbine wheel with an output side; and,
a torsional vibration damper including:
a drive hub;
at least one energy storage element;
first and second disc parts engaged with the at least one energy storage element;
an intermediate damper part axially located between the first and second disc parts and engaged with the at least one energy storage element;
a damper output part including the intermediate damper part or the second disc part; and
a centrifugal pendulum device arranged within the converter housing and having a pendulum flange with slightly swiveling pendulum masses thereupon, wherein:
the turbine wheel is non-rotatably connected at the output side to the drive hub;
the torsional vibration damper is actively arranged between the clutch output and the drive hub;
the pendulum flange is arranged axially between the torsional vibration damper and the turbine wheel and is directly non-rotatably connected to the damper output part of the torsional vibration damper, and
the pendulum flange is directly non-rotatably connected to the drive hub.

* * * * *